United States Patent [19]

Kaeufe et al.

[11] Patent Number: 5,151,152
[45] Date of Patent: Sep. 29, 1992

[54] METHOD FOR MANUFACTURING HEAT-ACTIVATABLE ARTICLES

[75] Inventors: Helmut Kaeufe, Mettmann; Christian Kipfelsberger, Hepberg, both of Fed. Rep. of Germany

[73] Assignee: RXS Schrumpftechnik-Garnituren GmbH, Fed. Rep. of Germany

[21] Appl. No.: 388,702

[22] Filed: Aug. 2, 1989

[30] Foreign Application Priority Data

Aug. 3, 1988 [DE] Fed. Rep. of Germany ....... 3826429

[51] Int. Cl.⁵ .............................................. B29C 61/02
[52] U.S. Cl. ..................................... 156/645; 29/557; 51/281 R; 264/155; 264/157; 264/162; 264/163; 264/230; 264/291; 264/293; 264/296; 264/328.1; 264/341; 264/342 R
[58] Field of Search ............... 264/138, 154, 155, 156, 264/157, 160, 162, 163, 210.1, 210.2, 211.12, 211.13, 230, 280, 284, 288.4, 291, 296, 294, 296, 328.1, 340, 341, 342 R, 342 RE; 29/557; 51/281 R; 156/625, 645

[56] References Cited

U.S. PATENT DOCUMENTS

| | | | |
|---|---|---|---|
| 3,012,918 | 12/1961 | Schaar | 264/156 X |
| 3,092,439 | 6/1963 | Harrison | 264/154 |
| 3,394,211 | 7/1968 | MacDuff | 264/154 |
| 4,018,640 | 4/1977 | Amberg | 264/230 X |
| 4,250,605 | 2/1981 | Chapman | 156/645 X |

FOREIGN PATENT DOCUMENTS

| | | | |
|---|---|---|---|
| 241776 | 10/1987 | European Pat. Off. | |
| 3523771 | 1/1987 | Fed. Rep. of Germany | 264/291 |
| 52-60873 | 5/1977 | Japan | 264/154 |
| 57-188323 | 11/1982 | Japan | 264/291 |
| 58-171917 | 10/1983 | Japan | 264/162 |
| 61-287722 | 12/1986 | Japan | 264/163 |
| 62-90221 | 4/1987 | Japan | 264/162 |
| 8103399 | 12/1981 | Netherlands | 264/160 |

OTHER PUBLICATIONS

English–Language Translation of Japanese Reference (Kokai) 57–188,323 (Published Nov. 19, 1982).

*Primary Examiner*—Leo B. Tentoni
*Attorney, Agent, or Firm*—Hill, Van Santen, Steadman & Simpson

[57] ABSTRACT

The invention is directed to a method for manufacturing heat-activatable articles from a synthetic thermoplastic material on which a shape memory is impressed by introducing molecular orientations and molecular structures. These articles, after the impressing of the shape memory, are subsequently subject to a further change in shape, at least in sub-regions thereof. The shape memory is influenced by this further change in shape.

17 Claims, 2 Drawing Sheets

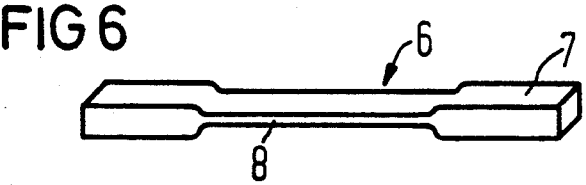
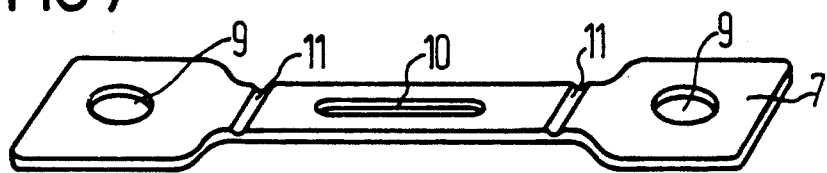
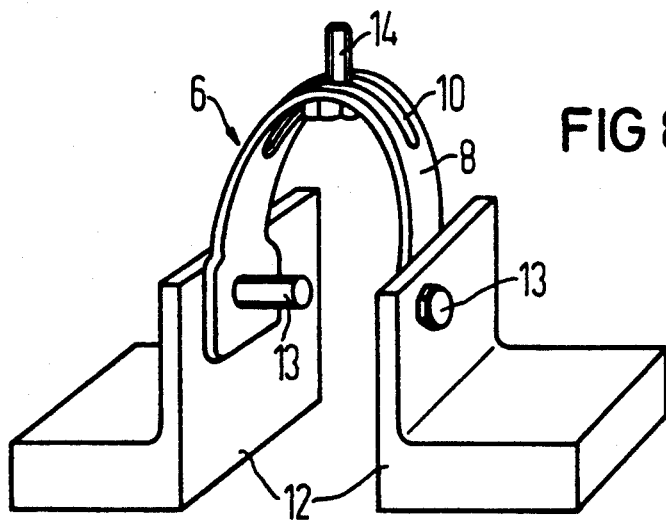
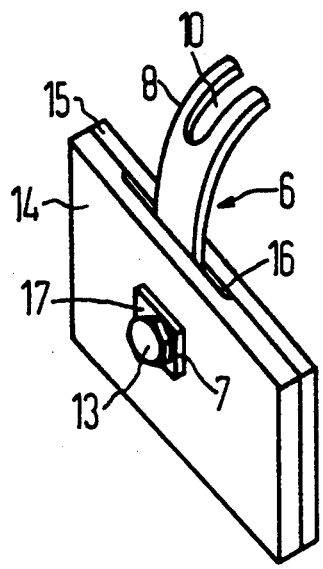

METHOD FOR MANUFACTURING HEAT-ACTIVATABLE ARTICLES

CROSS-REFERENCE TO RELATED APPLICATION

This application is related to our co-pending, commonly assigned patent application entitled "Method for Manufacturing Thermoplastic Articles Having Heat Activatable Regions", U.S. Ser. No. 388,954, filed Aug. 2, 1989.

BACKGROUND OF THE INVENTION

1. Field of the Invention

The invention is directed to a method for manufacturing heat-shrinkable articles made of a thermoplastic material on which a shape memory is impressed by introducing molecular orientations and molecular structures.

2. Description of the Prior Art

European Patent Application 0 241 776 discloses a method for manufacturing a thermoplastic part having shape memory wherein the shape memory is impressed by a pressure stretching method. With this method, molecular orientations that are fixed at a defined temperature are introduced into a preform in shape-stable condition under the action of pressure. Given the later application of heat, the resultant deformed part attempts to return to its original shape.

In such a method, as well as in the traditional methods for manufacturing articles having shape memory, all changes in shape must be defined at the time that the shape memory is impressed. A subsequent alteration of the ultimate end use shape (the shape which the article assumes after heat activation) is therefor not possible. Further, it is difficult to accurately control the ultimate end use shape where the article is to assume a complicated shape.

SUMMARY OF THE INVENTION

An object of the present invention is to set forth a method for manufacturing heat-activatable articles with which a further modification of the ultimate end use shape is possible after the impression of the shape memory. This object of the invention is achieved in that the shape of the articles is further modified after the impression of the shape memory. The shape memory and, therefor, the ultimate end use shape are capable of being influenced by the further modification.

The method of the invention offers particular advantages in that the thermoplastic articles (i.e., those made of polyoxymethylene, polyethylene, polypropylene, polyamide and others) that have their molecular orientations and molecular structures impressed (i.e., with stretching methods) are subsequently processed such that the change in the ultimate end use shape is selectably influenced by the subsequent processing when the article is later heated. Heat-activatable articles can thus be manufactured whose ultimate condition after the later heating deviates from the original shape of the pre-product. The directions in which the molecular orientations that were originally introduced act can also be influenced. Difficult shape designs or, respectively, re-deformations that were not capable of being achieved with the previously known methods or which could at most only by achieved with great difficulty can be carried out in an efficient manner as a result of the further change in shape used in the method.

There are standard methods which are used to re-shape the pre-product and thereby to impress the shape memory. For example, the reshaping may be carried out by using a pressure-stretching method in the solid state of the article which is performed under appropriately set reshaping temperature conditions. Such methods, under certain conditions, result in molecular orientations and molecular structures that are not uniform and are not uniformly distributed over the entire cross-section. Due to the contact with the shaping tool, the molecular orientations having the greatest shape changing effect usually lie in the edge layers of the deformed articles. The effect of molecular orientations on shape changing generally decreases toward the center of the wall of the deformed article. Thus, for example, a halving or division of such an article leads to two or more parts each having heat-activatable shape changing capabilities. Dependent on the re-shaping method and management of the method, a relatively clearly pronounced orientation gradient is present.

After the impressing of the shape memory with mechanical or chemical processing, the existing molecular orientations and molecular structures in the invention are designationally modified region-by-region with the removal of material by erosion of, for example, the outer edge layers or by introducing notches, grooves, bores or the like. The back-deformation occurring during later heating of the article when used as a heat-activatable element thus also ultimately changes. Given the mono-axial molecular orientations and molecular structures that are initially present, a linear change in shape no longer occurs when heated, as was normal in methods that were previously standard. Rather, a multi-dimensional change in shape occurs, as shall be explained in greater detail later with reference to exemplary embodiments. As a result thereof, an article manufactured in accordance with the method of the invention no longer assumes the shape of its original pre-product, but deviates therefrom to a greater or lesser degree dependent on the additional processing. Thus, the article has the capability of changing shape in arbitrary, three-dimensional directions and planes upon heating which can be defined by the additional processing.

This method of the invention thus allows product-oriented and method-oriented geometries that are beneficial for the pre-products from which heat-activatable articles having complicated, use-oriented changes in shape can be manufactured. For example, it is possible to manufacture specifically deformable, heat-activatable articles can be manufactured from an easily manufactured, injection molded or extruded, unstretched mass produced article by individual mechanical or chemical processing of the invention.

By combining different methods in the additional processing of the reshaped article, it is possible to manufacture articles such that, in addition to a complex change in shape, the article further meets other functional requirements such as, for example, bending, clamp motion or the like, as shall be set forth in greater detail with reference to exemplary embodiments.

Milling, boring, turning, grinding or the like, may be used for mechanical processing of the articles already provided with shape memory, whereas etching and solvent methods can be utilized for a chemical processing. Additional effects can thus be achieved by introducing bores, notches, grooves and the like. Given such methods, the articles can also be heated or cooled in a fixed condition, either before, simultaneously with or following the additional processing. In special instances, it is also possible to incorporate the additional processing steps in the original and stretching event so that a single tool, meeting the required functions, can be used to manufacture the article. Given articles having shape memory that, for example, are manufactured according to a multi-component injection molding method or according to a co-extrusion or, respectively, multiple-extrusion, either single or multiple components can be handled in the subsequent processing phases, so that additional possibilities of variation also may be realized.

The articles can be initially processed using different techniques and may be comprised of several materials. For example, the article may be manufactured in co-extrusion of the materials polyethylene having a crystalline melting point of 130° C. through 135° C. and polypropylene having a crystalline melting point of 163° C. through 165° C. Reshaping temperatures in the range from 50° C. through 100° C. given polyethylene, of 100° C. through 130° C. given polypropylene and of 50° C. through 150° C. given polyoxymethylene are appropriate given such an article. Partial heating, tempering, etc. is also possible given multi-component injection molded parts. Furthermore, multi-functional, heat-activatable changes in shape can be obtained by multiple application of identical, or of different, processing steps.

BRIEF DESCRIPTION OF THE DRAWINGS

Other objects, features and advantages of the invention will best be understood from the following detailed description taken in conjunction with the accompanying drawings, of which:

FIG. 6 is a perspective view of an injection molded shoulder bar before processing in accordance with the method of the invention.

FIG. 7 is a perspective view of the shoulder bar of FIG. 6 after a further processing step in accordance with the method.

FIG. 8 is a perspective view of the shoulder bar as applied in a potential use thereof and which has been subject to back-deformation as a result of the application of heat.

FIG. 9 is a perspective view of the shoulder bar as applied in a further use thereof and which has been subject to back-deformation as a result of the application of heat.

DESCRIPTION OF THE PREFERRED EMBODIMENT

Figure 1:
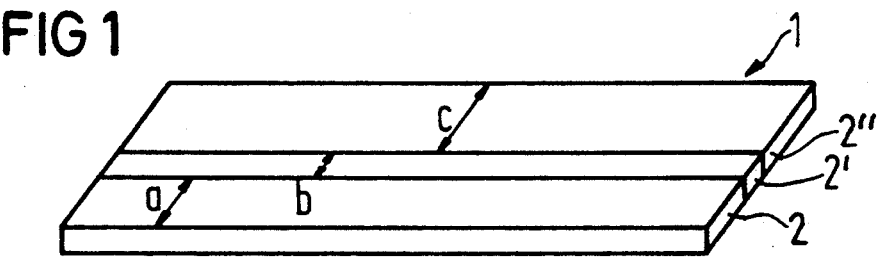
FIG. 1 is a perspective view of a heat-activatable article prior to being subject to further processing in accordance with the method of the invention.
Figure 2:
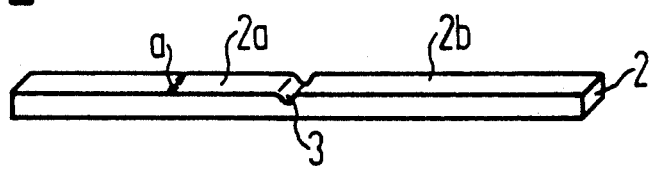
FIG. 2 is a perspective view of a heat-activatable article which has been derived from the article shown in FIG. 1 and which has been subject to a further processing step in accordance with the invention.

FIG. 1 shows a plate 1 manufactured of thermoplastic material in an injection molding method or by extrusion. After being subjected to a stretching process, the plate 1 is uni-axially stretched so that the shape memory impressed as a result thereof initially yields a change in shape in only one direction when heated. In a first processing event, the plate 1 can, for example, be cut into sub-article strips 2 having different widths a, b and c, so that a plurality of heat-activatable sub-article strips 2, 2' and 2'' are now present that are based on a single manufacturing event. Thus, a significant economic advantage is realized when compared to the individual manufacture of articles associated with previously defined methods.

Figure 3:
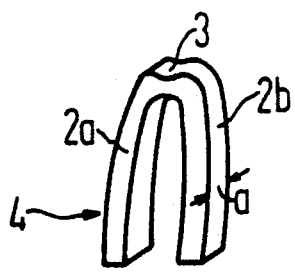
FIG. 3 is a perspective view of the article of FIG. 2 after back-deformation resulting from the application of heat.
Figure 5:
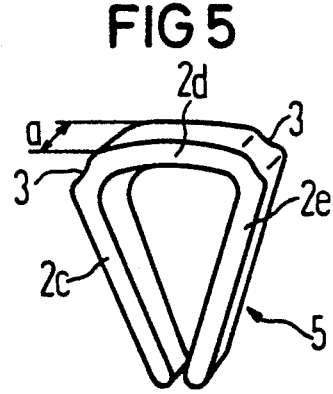
FIG. 5 is a perspective view of the article shown in FIG. 4 after back-deformation resulting from the application of heat.

The article is already heat-activatable in and of itself and can now be further modified in a further processing step, such that a further change in shape differing from the original shape can be achieved. Such a strip 2, for example, having a width a, may be processed by providing a notch 3 in the middle section of the strip which is transverse to the longitudinal axis, thereby forming legs 2a and 2b which maintain the original shape memory. Since, however, the molecular orientation and molecular structure was interrupted by the notch 3 on the surface side, the shrinking effect is only fully established on the unprocessed side. Consequently, the interruption leads to a bending of the strip 2 during subsequent heating. Thus, a clamp 4, as shown in FIG. 3, can be manufactured.

Figure 4:
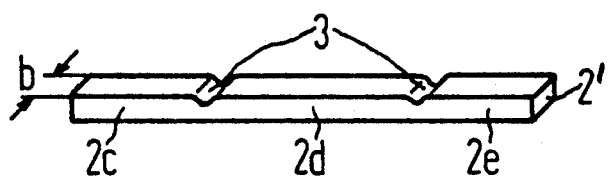
FIG. 4 is a perspective view of a further heat activatable article derived from the article shown in FIG. 1 and which has been subject to a further processing step in accordance with the method of the invention.

The exemplary embodiment of FIG. 4 shows a further strip 2' acquired from the plate of FIG. 1. In this case, however, two notches 3 were introduced at a distance 2d from one another. The result thereof is that the two leg parts 2c and 2e bend during heating and form a clamp 5, whereas the center leg 2d shrinks in length. The clamp opening is thereby constricted and exerts a clamping effect on the surrounded article.

As a further exemplary embodiment of the invention, FIG. 6 shows an injection molded and pressure-stretched shoulder rod 6. This shoulder rod 6 differs in thickness across its length. A thinner central region 8 is fashioned between the thicker edge regions, the thicker edge regions being provided for fastening. This shoulder rod 6 is subsequently mechanically processed and a bore hole is placed in each of the edge regions 7. Fastening pins are later inserted into these bores. Given the subsequent application of heat, the diameter of the bores changes such that the pins proceeding therethrough are clamped as a result of the molecular orientations produced in the region of the bore. Similar back deformation properties exist about the oblong hole 10 in the central region 8. Two notches 11, transverse to the longitudinal axis, have also been introduced by mechanical processing in the two transition regions between the central region 8 and the edge regions 7. As in the first exemplary embodiments, these notches 11 cause the article to bend during heating.

The ultimate result of the shoulder rod 6 is shown in FIG. 8, where it is chucked between two saddle members 12 and is secured with the pins 13. A further pin 14 that, for example, serves the purpose of suspension is introduced into the oblong hole 10.

FIG. 9 shows a further employment of the shoulder rod 6. Here, it is introduced between two plates 14 and 15. The plate 14 has a recess 16 for the shoulder rod 6.

A further recess 17 in the region of the pin 13 is also provided in the plate 14. When the shoulder rod 6 is exposed to heating, it thickens as a consequence of its impressed shape memory, so that the edge region 7 emerges from the recess 17 as a result of the increase in its wall thickness. Thus, a secure fit is achieved.

Represented herein is only a small selection of exemplary embodiments which are intended to indicate the variety of deformation possibilities which can be accomplished in heat-activatable articles when the method of the invention is applied. Thus, although modifications and changes may be suggested by those skilled in the art, it is the intention of the inventor to embody within the patent warranted hereon any changes and modifications as reasonably and properly come within the scope of this contribution to the art.

We claim:

1. Method for manufacturing heat-activatable articles from a thermoplastic material comprising the steps of:
   forming a thermoplastic article into a first shape;
   impressing a shape memory on said thermoplastic article by introducing molecular orientations and molecular structures as a result of deformation of said first shape thereby producing a second shape, said article capable of back-deforming from said second shape to said first shape upon application of heat to said article;
   removing selected areas of thermoplastic material from said article after having impressed said shape memory to modify at least a portion of the molecular orientations and structures introduced in impressing said shape memory and thereby altering said second shape to form a final shape, said article being capable of deforming to a designated end use shape that differs from said first shape when said article is heated, the difference between said designated end use shape and said first shape resulting from said removal of said selected areas of material from said article; and,
   selecting said areas in which said thermoplastic material is removed dependent upon said designated end use shape.

2. A method as recited in claim 1, further comprising the step of applying heat to said thermoplastic article thereby causing said thermoplastic article to deform from said final shape to said designated end use shape, said designated end use shape differing from said first shape.

3. A method as recited in claim 1, wherein the step of removing selected areas of thermoplastic material is further defined by removing said areas of thermoplastic material by a mechanical process.

4. A method as recited in claim 2, wherein the step of removing selected areas of thermoplastic material is further defined by removing selected areas of said thermoplastic material by a mechanical process selected from the group consisting of milling, turning, boring and grinding processes.

5. A method as recited in claim 1, wherein the step of removing selected areas of thermoplastic material is further defined by removing said selected areas of thermoplastic material by a chemical process.

6. A method as recited in claim 5, wherein the step of removing selected areas of thermoplastic material is further defined by removing selected areas of thermoplastic material by a chemical process selected from the group consisting of etching and dissolving processes.

7. A method as recited in claim 1, wherein the step of removing selected areas of thermoplastic material is further defined by removing selected areas of said thermoplastic material at edge layers of said article.

8. A method as recited in claim 1, wherein the step of removing selected areas of thermoplastic material is further defined by removing selected areas of thermoplastic material to form a groove in said final shape of said article.

9. A method as recited in claim 1, wherein the step of removing selected areas of thermoplastic material is further defined by removing selected areas of thermoplastic material from said article to form a bore in said final shape of said article.

10. A method as recited in claim 1, further defined in that the steps of removing selected areas of thermoplastic material and impressing a shape memory on said thermoplastic material are integrated in a single process step.

11. A method as recited in claim 1, wherein the step of forming a thermoplastic article into said first shape is further defined by forming said thermoplastic article using a multi-component injection process to form said article into said first shape.

12. A method as recited in claim 1, wherein the step of removing selected areas of thermoplastic material is further defined by removing said selected areas of thermoplastic material by both a mechanical process and a chemical process.

13. A method as recited in claim 1, wherein the step of impressing said shape memory is further defined by impressing said shape memory on a thermoplastic article comprised of polyoxymethylene by said stretching process using a stretching temperature between 50° C. through 150° C.

14. A method as recited in claim 1, wherein the step of impressing said shape memory is further defined by impressing said shape memory on a thermoplastic article comprised of polyethylene by a stretching process using a stretching temperature between 50° C. through 130° C.

15. A method as recited in claim 1, wherein the step of forming said thermoplastic article into said first shape is further defined by forming said article from a thermoplastic selected from the group consisting of polyethylene, polypropylene, polyamide and polyoxymethylene.

16. Method for manufacturing heat-activatable articles of thermoplastic synthetic comprising the steps of:
   forming a thermoplastic article into a first shape;
   impressing a shape memory on said thermoplastic article by introducing molecular orientations and molecular structures as a result of deformation of said first shape thereby producing a second shape, said article capable of back-deforming from said second shape to said first shape upon application of heat to said article;
   removing selected areas of thermoplastic material from said article after having impressed said shape memory thereby altering said second shape to form a final shape and forming exposed surfaces where said thermoplastic material is removed, said final shape being capable of deforming to a designated end use shape that differs from said first shape when said article is heated, the difference between said designated end use shape and said first shape resulting from said removal of said selected areas of material from said article; and applying heat to said thermoplastic article thereby causing said thermoplastic article to deform from said final shape to said designated end use shape, said designated end use shape differing from said first shape, said difference particularly defined by molecular orientations in said exposed surfaces.

17. Method for manufacturing heat-activatable articles from a thermoplastic material comprising the steps of:

forming a thermoplastic article into a first shape;

impressing a shape memory on said thermoplastic article by introducing molecular orientations and molecular structures as a result of deformation of said first shape thereby producing a second shape, said article capable of back-deforming from said second shape to said first shape upon application of heat to said article;

dividing said article into a plurality of sub-articles after having impressed said shape memory, at least one of said sub-articles having a third shape, said at least one of said sub-articles being capable of back-deforming from said third shape to a shape corresponding to said first shape;

removing selected areas of thermoplastic material from at least one of said articles having said third shape thereby altering said third shape to form a final shape and forming exposed surfaces where said thermoplastic material is removed; and applying heat to said thermoplastic article thereby causing said thermoplastic article to deform from said final shape to designated end use shape, said designated end use shape differing from said shape corresponding to said first shape.

* * * * *